July 18, 1939.

J. W. JONES ET AL 2,166,157

BRAKE

Filed Jan. 26, 1937

INVENTORS
Joseph W. Jones
Frank C. Reeves
BY
ATTORNEY.

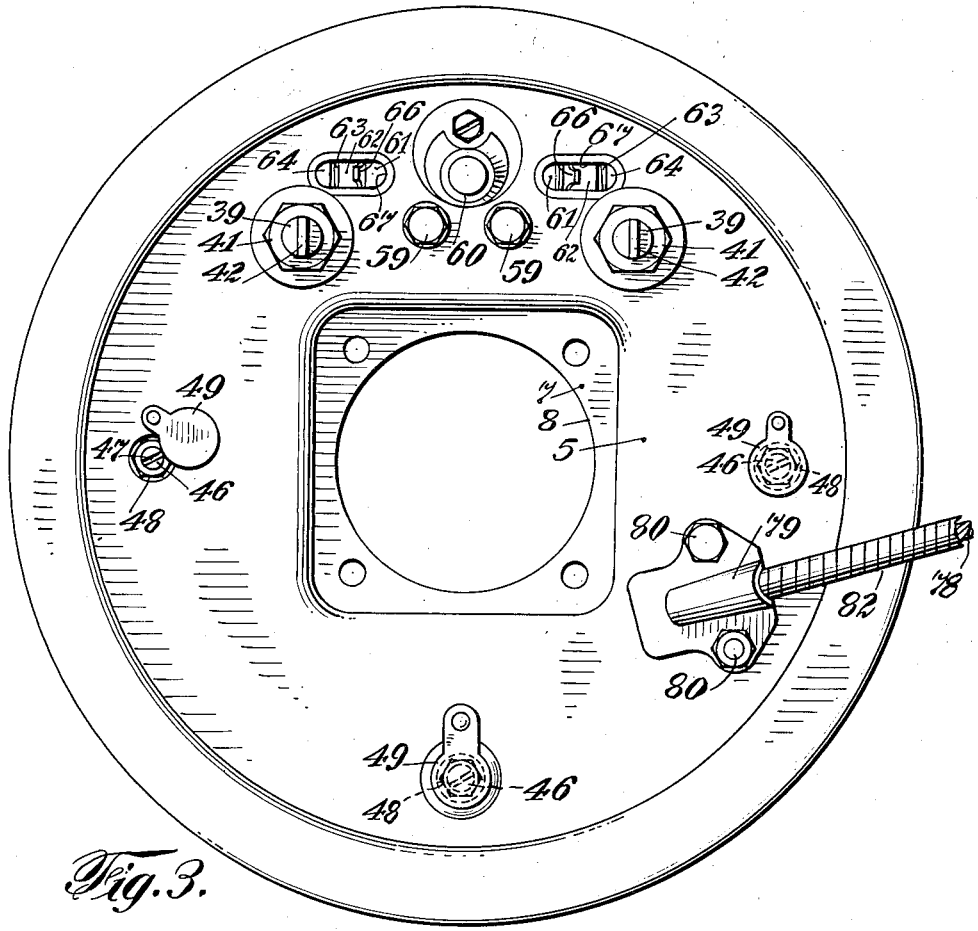

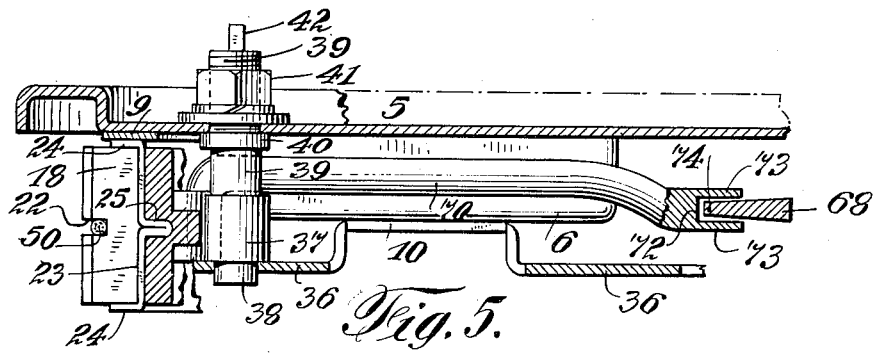
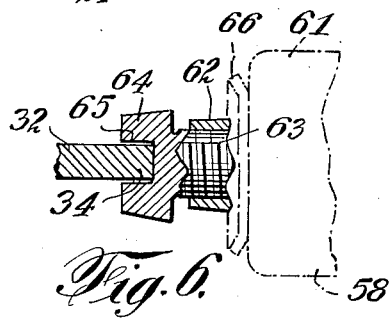
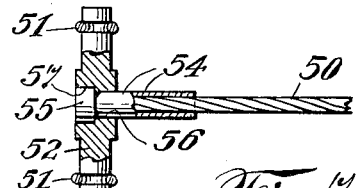
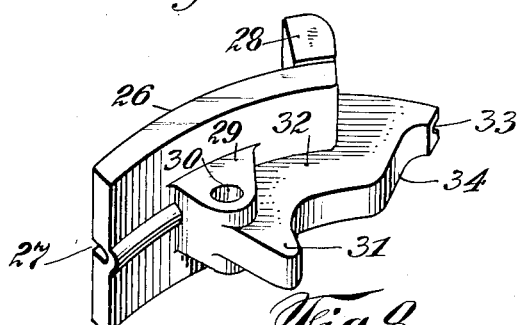
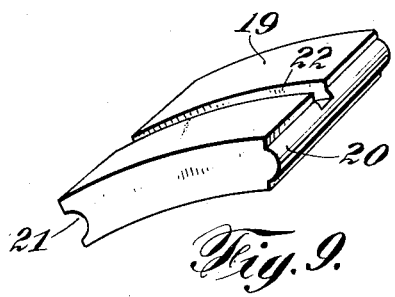
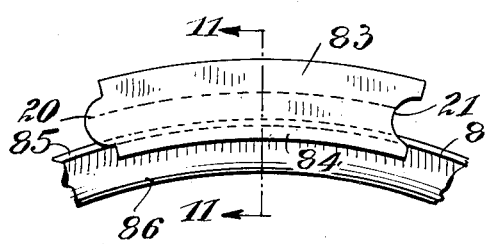
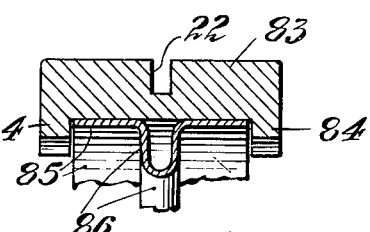

July 18, 1939.  J. W. JONES ET AL  2,166,157

BRAKE

Filed Jan. 26, 1937  6 Sheets-Sheet 5

INVENTORS
Joseph W. Jones
Frank C. Reilly
Herman Freeman
BY their ATTORNEY.

Patented July 18, 1939

2,166,157

UNITED STATES PATENT OFFICE 2,166,157

BRAKE

Joseph W. Jones and Frank C. Reilly, New York, N. Y.

Application January 26, 1937, Serial No. 122,342

20 Claims. (Cl. 188—78)

Our invention relates to brakes and refers particularly to brakes of the self-energizing or servo type which utilize the braking drag for automatically increasing the braking effect, and further refers particularly to brakes having an arcuate series of individually removable and replaceable brake blocks.

The brake device of our invention is especially suitable for motor vehicles, but is capable of other uses.

An important object of our invention is to provide adjustment for taking up wear upon the brake blocks without disturbing the normal functioning of the brake in its operation.

The interrelation of parts in the brake of our invention is as follows:

Means are provided for radially adjusting and expanding a circumferentially extended brake block guide so as to compensate for wear upon the peripherally outer braking faces of an arcuately extended series of abutting brake blocks which in operation are expanded into abutting braking engagement with a rotating brake drum by means of circumferential thrust upon such series.

More particularly, rotatively adjustable cams are utilized.

Adjustable abutment stops are provided for the end blocks in the series, to be adjusted in conformity with the adjustment of the brake block guide, more particularly, these stops being in the form of rotatively adjustable cams.

Means are provided for adjusting brake-applying means in conformity with the adjustment of the abutment stops and of the brake block guide.

More particularly the latter adjusting means are in the form of longitudinally adjustable piston rod extensions of a hydraulic brake-applying cylinder.

Other brake-applying means are provided, each of the two brake-applying means being operable independently of the other and without the braking operation being obstructed in either instance.

Means are provided by which, in each instance, brake-applying thrust is applied to the terminal brake blocks in the series and acts exclusively upon these blocks, without disturbing the adjustable member by which the brake block elements are carried and guided.

As a particular constructional feature, a pair of thrust-transmitting members are provided which respectively abut against the spaced ends of the terminal brake blocks in the series and which, in the released condition of the brake, abut against the abutment stops, and which are acted upon by each of the brake-applying means.

Particularly considered, the brake-block guide is in the form of a resilient arcuate member which is movably positioned and guided upon a stationary mounting frame.

Joints between the abutting brake blocks are so formed as to maintain these blocks in circumferential alignment with each other.

A particular form of a retractile spring-actuated coupling is provided between, and for drawing toward each other, the ends of a flexible tensile member which encircles the series of brake blocks and by which the brake is released whenever brake-applying force is discontinued.

One complete form of our invention, together with modifications as to some of its parts, will now be particularly described with reference to the accompanying drawings, in which similar parts are designated by similar numerals.

Figure 3 is a reduced elevation as viewed from the rear in Figure 1, and of the corresponding parts as viewed from the right in Figure 2, as indicated by the line 3—3.

Figure 4 is an enlarged broken plan view from above in Figure 3, showing parts which appear in Figures 1, 2 and 3.

Figure 5 is a broken partial section on the irregular line 5—5 of Figure 1.

Figure 6 is an enlarged broken sectional view taken on the line 6—6 of Figure 1, showing parts which appear at the right in Figure 4.

Figure 7 is a similar view on the line 7—7 of Figure 1, these parts being shown at the left in Figure 4.

Figure 8 is an enlarged top and inner side perspective view of the thrust-transmitting member which appears at the top and left in Figure 1, and is at the right in Figure 4.

Figure 9 is a perspective view of one of the intermediate brake blocks which appear in a series thereof in Figure 1.

Figure 10 is an enlarged broken side elevation showing a modified form of the brake-block guide and a correspondingly modified brake block.

Figure 11 is a vertical section on the line 11—11 of Figure 10.

Figure 14:
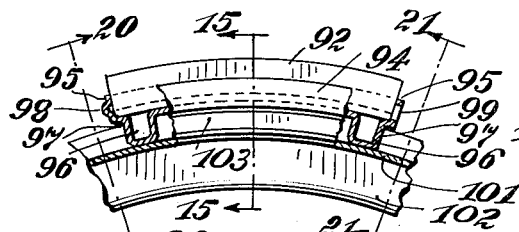
Figure 14 is a broken side elevation partly in section of another modified brake block consisting of a carrier part and a braking part, both of which are modified.
Figure 15:
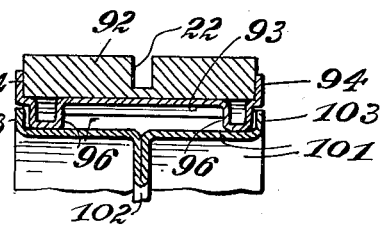
Figure 15 is a vertical section on the line 15—15 of Figure 14.
Figure 20:
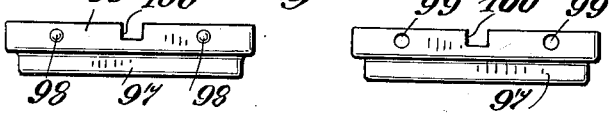
Figure 21:

Figure 20 is an elevational view from the left and Figure 21 is a similar view from the right in Figure 14 of the carrier part only of the two-part brake block shown in Figures 14 and 15, and as indicated respectively by the lines 20—20 and 21—21 in Figure 14.

Figure 1:
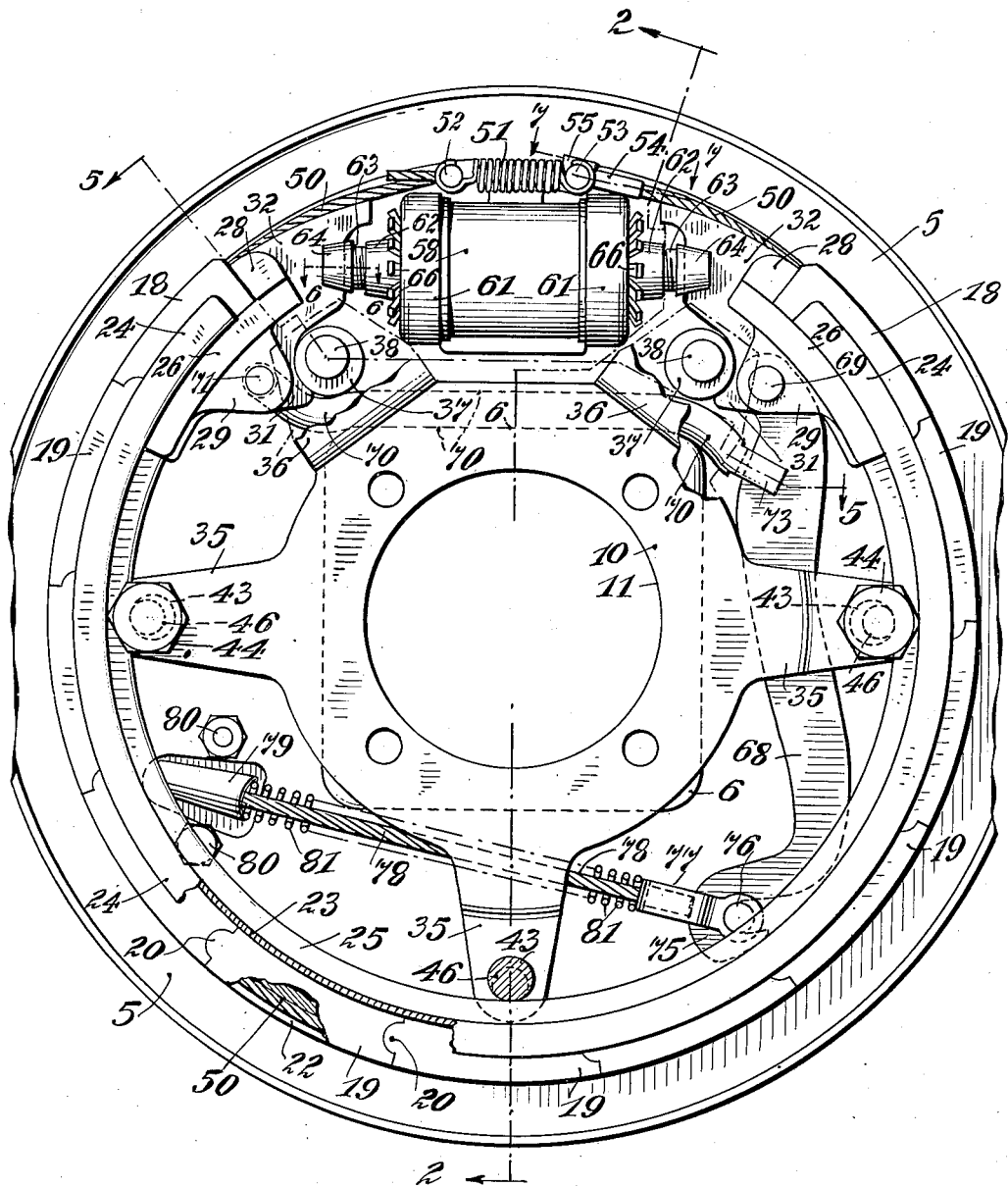
Figure 1 is an outer side elevation as viewed from the line 1—1 in Figure 2, with the brake drum, axle shaft and its housing omitted, thus showing the brake mechanism in an unattached relation, and shows one form of an automobile brake construction of our invention.
Figure 22:
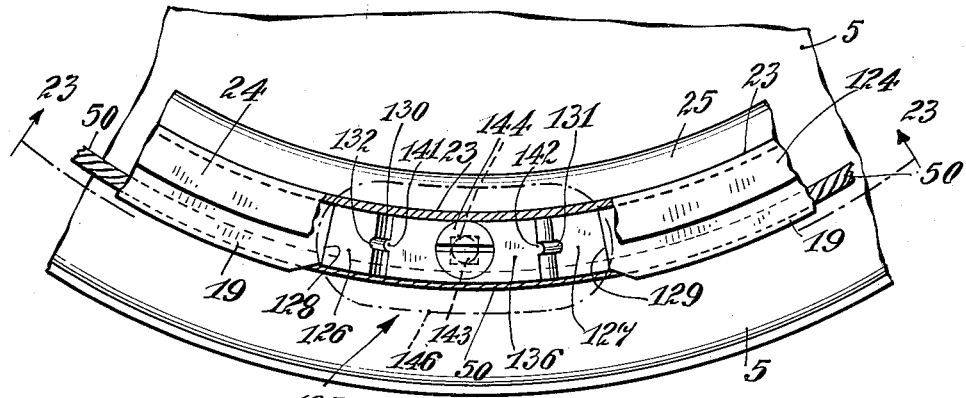

Figure 22 is a fragmentary side elevation similar to Figure 1, showing other means of expanding peripherally a worn down brake lining. This view being taken along the line 22—22 of Fig. 23.

Figure 23:
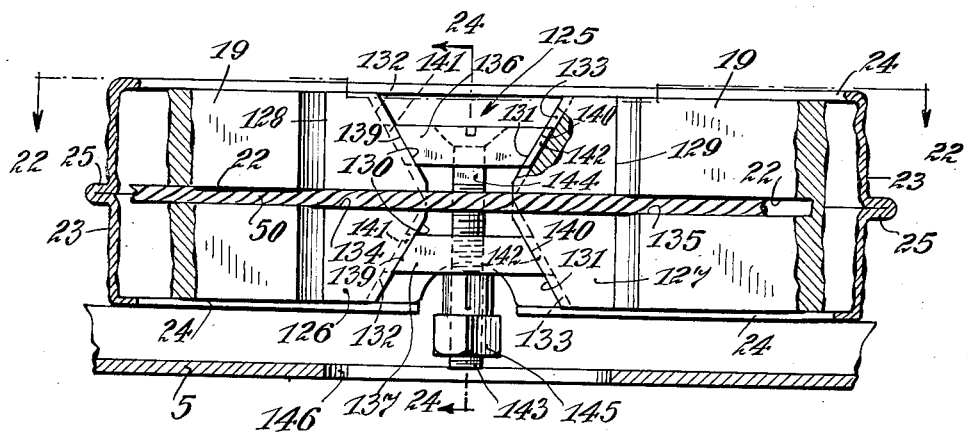

Figure 23 is a sectional elevational view taken on the line 23—23 of Figure 22.

Figure 24:
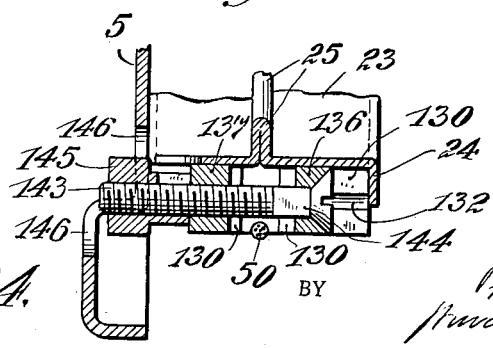

Figure 24 is a cross section, taken on the line 24—24 of Figure 23.

Figure 2:
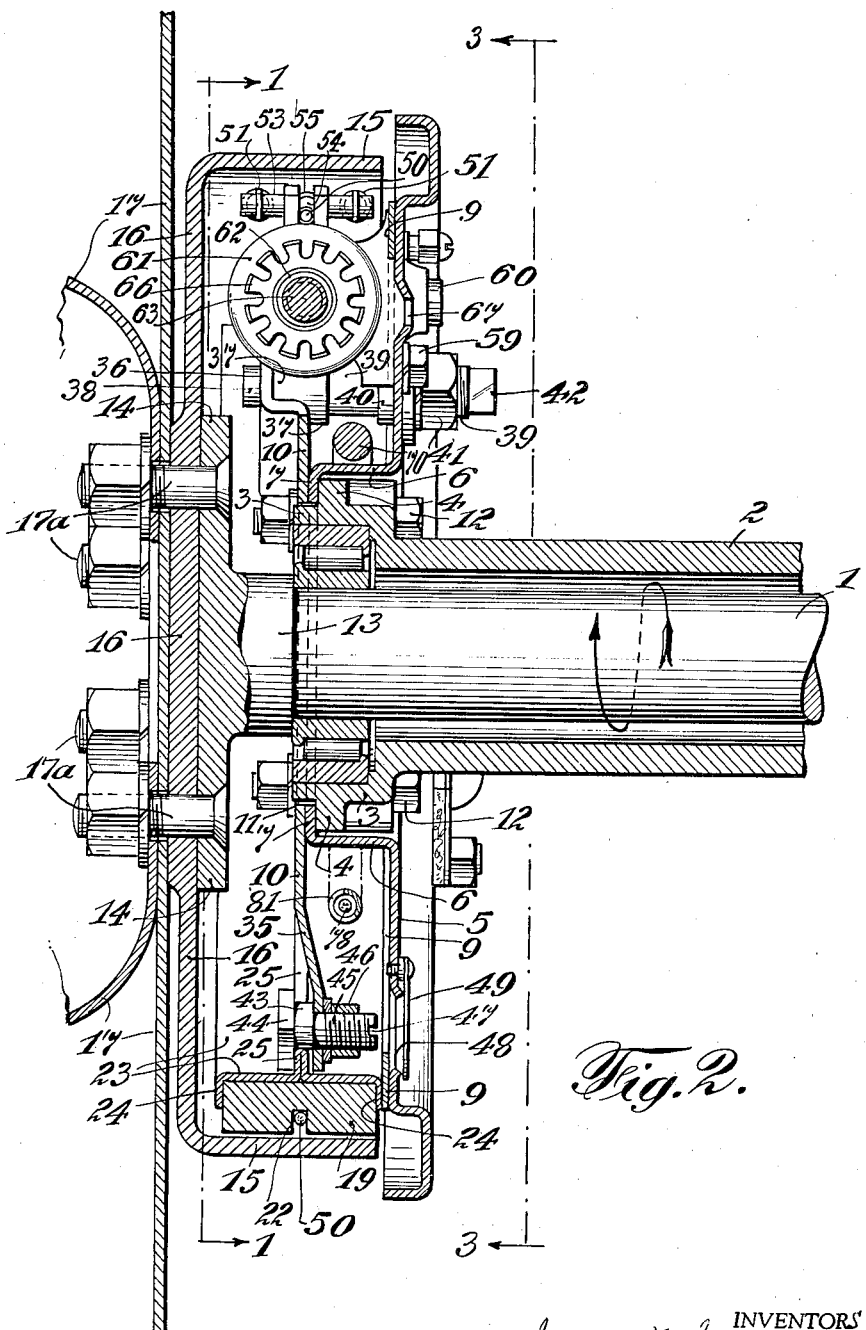
Figure 2 is a section taken on the irregular line 2—2 of Figure 1, and further shows the brake drum, together with portions of an automobile wheel, its axle shaft and the shaft housing, thus showing the brake construction in its attached operable relation.

Figures 1 to 9 inclusive of the accompanying drawings illustrate one complete form of our invention as embodied in a brake for motor vehicles. The automobile parts shown in Figure 2 are of a well known form of standardized construction, to which the brake device of our invention has been adapted, but to which it is by no means limited in its application. The drawings indicate the brake as adapted for the left rear wheel of the automobile, but it can be similarly installed as to each of the wheels.

A rotatable axle shaft 1 is journaled in a stationary shaft housing 2 having an enlarged end 3 provided with a square flange 4. A substantially usual form of mounting plate 5 has laterally inturned squared walls 6—6 having a centrally inturned flange 7 provided with a circular opening 8 (Figure 3).

A filler ring plate 9, the thickness of which may be different, as determined by the dimensions of other parts, or which in some instances could be omitted, is fixed upon the inner face of the mounting plate 5.

An internal spider plate 10, having a circular central opening 11 (Figure 1), abuts against the inner face of the mounting plate flange 7, which in turn abuts against the housing flange 4, which fits within the squared walls 6—6. The mounting plate flange 7 and the spider plate 10 are fixedly secured together and to the housing flange 4 by means of bolts 12—12. The mounting plate 5 and spider plate 10 thus form a two-part stationary mounting frame.

The shaft 1 has an enlarged end 13 provided with a flange 14. A usual form of rotatable brake drum has a cylindrical inturned braking flange 15 formed upon a web disc or plate 16, the inner face of which abuts against the shaft flange 14. An automobile wheel 17 of a standard form abuts centrally against the outer face of the drum disc 16. The shaft flange 14, the brake drum web plate 16 and the wheel 17 are all fixedly secured together by means of bolts 17A—17A, so that thus the brake drum 15—16 is rotatable with the wheel 17.

An extended arcuate series of circularly curved circumferentially abutting brake blocks is provided, to be moved into or out of braking engagement with the inner face of the brake drum flange 15. The length of such series shown in the drawings is slightly less than ⅝ of a circle.

This series consists of terminal blocks 18—18 and intermediate blocks 19—19. Throughout this series, the blocks are not attached to each other, nor to anything else.

Joints between the abutting blocks are formed by a semi-circular projection 20 on the end of any one block which fits into a recess 21 in the end of the next block in the series. This maintains all of the blocks in true circumferential alignment with each other. The terminal blocks 18—18 have flat radially disposed outer ends. Each of the brake blocks 18—18 and 19—19 is provided with a deep peripheral groove 22.

All of the brake blocks are guided in their movements by a long arcuate guide member 23, shown as of slightly less length than the series of blocks, so that thus the outer ends of the terminal blocks 18—18 project beyond the ends of this member. This particular guide member 23 has peripheral flanges 24—24 forming lateral guides for the blocks 18—18 and 19—19.

This guide member 23 is unattached to other parts and has freedom for limited floating circumferential movement, as will be evident later. It has an internal rib 25 by means of which it is positioned and guided upon the stationary mounting frame formed by the plates 5 and 10, as described later.

This particular guide member 23 is indicated as being formed of sheet metal.

A pair of similar arcuately slidable thrust-transmitting members 26—26 have an abutting engagement respectively with the outer ends of the end blocks 18—18. Each member 26 has an arcuate face slidable along the inner face of the end portion of the block-guiding member 23, and has a peripheral groove 27 by which it is guided laterally along the rib 25.

Outwardly beyond the groove 27 each member 26 has a radial lug 28 which abuts the outer end of one of the terminal blocks 18—18. Upon its radially inner side each member 26 has a thick thrust-receiving lug 29 through which there is a transverse bore 30. A thinner positioning toe 31 projects from the lug 29.

A rib 32 extends on a concave curve from the toe 31 and projects from the radial lug 28 at the outer end of the member 26, where it presents an arcuate surface provided with a shallow peripheral groove 33. The rib 32 forms a thrust-receiving end shoulder 34 outwardly beyond the block-engaging lug 28. The purposes of the described particular features 29, 31 and 34 will be made clear later.

The block-guiding member 23 is desirably resilient and is sufficiently yieldable to be expanded for taking up wear on the brake blocks 18—18 and 19—19.

The internal plate 10 has a plurality of radially extended spider arms. Of three similar arms 35—35—35, one extends downwardly and the other two extend horizontally in diametrical relation. In this particular construction, the outer end portions of these arms 35—35—35 are slightly bent in an offset relation toward the main mounting plate 5, as shown in Figure 2 for the lower arm. The invention is not limited to having just three of these arms 35—35—35, since there could be a larger number and differently arranged, or the plate 10 could be in general of a different shape.

Two spider arms 36—36 which are similar to each other extend radially upward at divergent angles. These arms 36—36 are bent to a considerable extent farther away from the mounting plate 5 and in an offset relation with the flat central portion of the spider plate 10, as shown in Figures 2 and 5 and indicated in Figure 1.

A pair of similar strong stationary abutments 37—37 are respectively rigidly carried by and extend between the arms 36—36 and the mounting plate 5. In the released condition of the brake shown in the drawings, these abutments are respectively abutted by the positioning toes 31—31 of the thrust-transmitting members 26—26.

It has been found desirable to have the abutments 37—37 adjustable in conformity with varying positions of the members 26—26, when their toes 31—31 are in abutting engagement with these abutments, as shown in Figure 1. Hence, these abutments 37—37 are shown as made in the form of eccentric cams which are rotatively adjustable.

Each of the abutment cams 37—37 has an inner stem portion 38 journaled in the corresponding arm 36 and has an outer stem portion 39 journaled in the mounting plate 5. The outer stem portion 39 has a collar flange 40 formed thereon which abuts against the inner face of the mounting plate 5.

This stem portion 39 is threaded outwardly from its collar 40 and carries a clamp nut 41 at the exposed side of the plate 5, and by means of which the cam 37 is fixedly secured in place and in adjusted position. The end of the outer stem portion 39 has a flattened projection 42 by which the cam 37 can be rotatably adjusted when the nut 41 has been loosened. It is obvious that a screw-driver slot could be provided in place of the projection 42.

The ends of the arms 35—35—35 respectively carry rotatively adjustable eccentric cams 43—43—43 against which the rib 25 of the block-guiding member 23 abuts. These cams are at the outer sides of the arms 35—35—35. Each cam 43 carries a polygonal head 44 at its end remote from the arm 35. The other end of the cam has a threaded stem 45 which carries a clamp nut 46 beyond the arm 35, by means of which the cam 43 is fixedly secured in adjusted position upon the arm 35.

The end of the cam stem 45 has a screw-driver slot 47 by which the cam 43 can be rotatably adjusted when the nut 46 has been loosened. The mounting plate has openings 48—48—48 through which access can be had to the nuts 46—46—46 and the ends of the stems 45—45—45. These openings have dust-excluding covers 49—49—49. The polygonal shape of the inner cam head 44 is a convenience in assembling.

The rib 25 of the block-guiding member 23 is movably guided between the ends of the spider arms 35—35—35 and the cam heads 44—44—44.

In this particular construction, the member 23 is further laterally guided by the filler ring plate 9. In addition to the ring plate 9, the upper end portions of the member 23 are guided by the spider arms 36—36 in engagement with the lugs 29—29 of the thrust members 26—26. In the illustrated construction, without the filler plate 9, the member 23 would simply have more lateral tolerance.

Wear on the brake blocks 19—19 at the bottom is taken up by adjusting the lower cam 43. Wear on the brake blocks 18—18 and 19—19 at the sides is taken up by adjusting the diametrically disposed cams 43—43. These two latter cams spring the side arms of the member 23 away from each other. When the cams 43—43—43 have been adjusted, it is desirable to adjust the abutment cams 37—37, for taking up unnecessary lost motion.

It is convenient in adjusting the cams, first to cause the brake blocks to abut against the brake drum, then to ease the cams back sufficiently to provide clearance between the blocks and the drum.

The block-guiding member 23 is free to have limited circumferential floating movement, since its ends are spaced from the radial block-engaging thrust-member lugs 28—28. This clearance prevents the brake-applying movement of these lugs from being obstructed by the ends of the guide member 23.

The brake is released and normally thus maintained by means of a flexible tensile member 50 which encircles the series of brake blocks 18—18 and 19—19. This member is shown as a cable seated in the brake-block grooves 22—22, and extending along the peripheral grooves 33—33 of the thrust members 26—26.

The spaced ends of the cable 50 are detachably connected together and resiliently drawn toward each other by means of a coupling which includes a pair of strong retractile springs 51—51. This coupling has a pair of spaced cross bars 52 and 53 to the ends of which the ends of the springs 51—51 are connected. This coupling is disposed at the top, in the upper part of the open space between the thrust members 26—26.

The cross bar 52 has an opening through it through which an end portion of the cable 50 passes in doubled or folded form. The pinching of the fold bight between the walls of this opening securely anchors the cable to the cross bar 52. This also affords a convenient way of determining and adjusting the effective length of the cable 50.

The other end of the cable 50 is fixed within a ferrule 54 having a head 55 at its outer end. The other cross bar 53 has in it a transverse slot 56 of a width just sufficient to allow the easy passage of the ferrule stem transversely into and out of it. One end of this slot desirably has a hollowed out enlargement 57 forming a socket to receive the ferrule head 55, as shown in Figures 4 and 7.

The ferrule 54—55 can be snapped into or removed from the slot 56—57. Because of the strength of the springs 51—51, a simple form of suitable tool is used for doing this. The cable 50 can thus be readily put in place in assembling and as readily removed for the replacement of worn brake blocks.

A commonly used form of hydraulic brake-applying cylinder 58 is horizontally disposed between the spaced ends of the thrust members 26—26 and is fixedly secured to the mounting plate 5 by means of a pair of attaching bolts 59—59. A nipple 60 provides for the passage of operating liquid into and out of the cylinder 58. Means, extraneous to the brake device, by which such liquid is controlled, are well understood.

This particular type of cylinder 58 has its internal pistons (not shown) carried by movable end cover caps 61—61. Each cap 61 has an external central boss 62 formed thereon which has an outwardly opening threaded bore. A threaded pin 63 is adjustably screwed to the desired extent into the boss 62. This pin has an outer head 64 in the end face of which there is a transverse slot 65. This pin 63 thus forms an outer adjustable thrust-applying piston-rod extension.

The thrust-receiving end shoulders 34—34 of the thrust members 26—26 are seated respectively in the slots 65—65 of the pins 63—63. The cylinder heads or caps 61—61 are rotatable as well as slidable longitudinally upon the cylinder 58. By rotating a cylinder cap 61, its pin 63 can be adjusted inwardly or outwardly, as desired, while a shoulder 34 prevents rotation of the pin 63.

This adjustment of the extension pins 63—63 is in conformity with the adjustment of the stop cams 37—37, by which the spacing between the ends of the thrust members is varied in conformity with the adjustment of the take-up cams 43—43—43, or for other reasons.

Each cylinder cap 61 fixedly carries a peripherally toothed member 66. Horizontally slotted openings 67—67 through the mounting plate 5 provide access to the toothed members 66—66 for rotating them by means of a screw-driver or other simple tool, for thus adjusting the thrust-applying pins 63—63.

In conformity with usual practice as to brakes of the hydraulic type, in carrying out my invention it embodies other brake-operating means by which the brake can be manually operated independently of the hydraulic cylinder 58, and as an emergency brake.

A downwardly extended brake-operating lever 68 is disposed within the arcuate guide member 23 at one side from the center and within the space between the mounting plate 5 and an arm 35 of the spider plate 10.

A thrust-applying pivot pin 69 connects the upper end of this lever 68 to the thrust-receiving lug 29 of one of the thrust-transmitting members 26—26. A stiff mainly horizontal thrust link or rod 70 has a turned-over end portion 71 by which it is pivotally connected to the thrust-receiving lug 29 of the other thrust-transmitting member 26.

The other end portion of the thrust rod 70 is slightly inclined downwardly and has in its end a deep slot 72 forming lateral arms 73—73 which embrace a slightly inwardly inclined edge of a thrust applying shoulder portion 74 of the lever 68 at a suitably spaced distance below its pivot 69. This rod 70 is guided along the upper face of the upper horizontal mounting plate wall 6.

The operating lever 68 is a floating lever, since it has no fixed fulcrum, but has two movable fulcra, one at its pivot 69 and the other at the point of abutment of its shoulder 74 with the bottom of the slot 72 in the end of the rod 70. Thus, when operating force is applied to the lower end of the lever 68, to move it toward the left as viewed in Figure 1, it will not only thrust the brake-applying members 26—26 away from each other, but the thrusting force upon the member 26 at the left will be appreciably greater than that upon the other member 26.

In the forward direction of travel of the automobile, the revolution of the brake drum flange 16 about the series of brake blocks 18—18 and 19—19 will be in a counter-clockwise direction as viewed in Figure 1 and as indicated by the spiral arrow upon the shaft 1 in Figure 2.

This results in a quick pick-up of the brake blocks 18—18 and 19—19 in the automatic servo action of the rotating brake drum 15—16, since the servo action will be the most strongly started at the beginning end of the series of blocks, with respect to the direction of rotation of the brake drum. The thus quickly augmented braking effect is an advantage in emergency use.

The lower end portion of the operating lever 68 is bent inwardly toward the left (Figure 1) so as to have clearance for its movement between the mounting plate walls 6—6 and the guide member 23, and at its lower end carries a hook 75 having its end directed to the right.

The hook 75 is engaged by a pin 76 carried by the end of a ferrule 77 which is fixed upon the end of a flexible brake-applying member which is shown as a cable 78. A guide sleeve 79 extends through the mounting plate 5 and is fixedly secured by bolts 80—80. The cable 78 passes at an upward inclination beneath the lower wall 6 and to the outside of the mounting plate 5 through the guide 79.

When there is no pull upon the cable 78, it is retracted by an expansion spring 81, which surrounds it between the ferrule 77 and the guide 79. The brake-releasing springs 51—51 are thus relieved. Beyond the guide 79 the cable 78 is covered by a usual form of flexible casing 82. Means are well understood by which a brake-applying pull can be exerted upon the cable 78.

The operation of the described brake mechanism is as follows:

When the brake is applied by means of the hydraulic cylinder 58, the shoulder 74 of the lever 68 and the bottom of the slot 72 in the end of the rod 70 are freely moved away from each other. When the brake is applied by means of the lever 68, the shoulders 34—34 of the thrust members 26—26 are moved freely away from the bottoms of the slots 65—65 in the heads 64—64 of the cylinder cap pins 63—63. Thus the braking operation is not obstructed in either instance.

In each instance, the brake-applying thrust is applied exclusively to the terminal brake blocks 18—18, without disturbing or affecting the member 23 by which all of the brake blocks are carried and guided. The resultant radial component of force expands the series of brake blocks into abutting braking engagement with the brake drum flange 15, and correspondingly moves them away from the periphery of the member 23.

The circumferential braking thrust upon the brake blocks is received by either one or the other of the stops formed by the abutment cams 37—37, depending upon the direction of rotation of the brake drum 15—16.

As soon as the brake has been applied, the automatic self-energizing servo action, produced by the braking thrust of the rotating brake drum 15—16 upon the brake blocks 18—18 and 19—19, becomes effective to augment the braking pressure of all of the brake blocks upon the braking surface of the drum flange 15. The principle of servo action in brakes is well understood.

The brake is applied in opposition to the force of the brake-releasing springs 51—51, which are slightly stretched by the expansive movement of the series of brake blocks 18—18 and 19—19. As soon as the manually controlled brake-applying force is discontinued, the springs 51—51 cause the cable 50 to draw the brake blocks 18—18 and 19—19 radially inward out of abutting engagement with the braking surface of the drum flange 15 and into abutting engagement with the periphery of the member 23, the outer ends of the terminal blocks 18—18 then moving arcuately toward each other, without a corresponding movement of their guiding carrier member 23.

In Figures 10 and 11, the brake block 83 has inner flanges 84—84 by which it is laterally positioned upon a guide member 85 having a hollow internal positioning rib 86.

Figure 12:
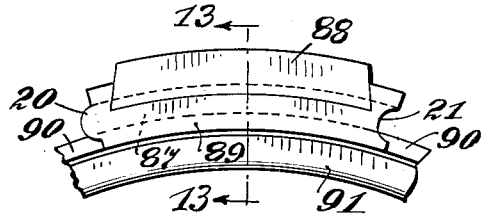
Figure 12 is a broken side elevation showing a modified brake block having a facing part of braking material and a carrier part of a different material.
Figure 13:
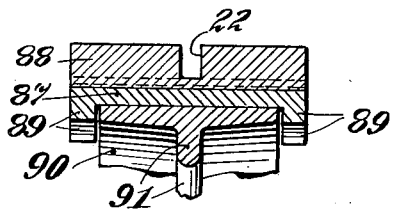
Figure 13 is a vertical section on the line 13—13 of Figure 12.

Figures 12 and 13 show a two-part brake block having a base or carrier part 87, which can be of metal, and an outer facing part 88 of braking material, which is set into its carrier 87 with a dovetail connection at its ends. In other respects the construction shown is substantially similar to that shown in Figures 10 and 11, but could be different.

The carrier part 87 has inner flanges 89—89 by which it is laterally positioned upon a guide member 90 having a positioning rib 91 and of thick and solid form.

The two-part brake block of Figures 14, 15, 20 and 21 has an outer braking part 92 seated within a receptacle provided by a carrier part formed of pressed out sheet material, which can be metal, and having a bottom 93, side walls 94—94, end walls 95—95, inner positioning ridges 96—96, and strengthening inner end ridges 97—97. The ridges 96—96 are inset from the side walls 94—94 and the ridges 97—97 are similarly inset from the end walls 95—95.

One of the end walls 95—95 has a pair of projections 98—98, while the other end wall 95 has a pair of apertures 99—99, for maintaining all of the blocks in the series in circumferential alignment. The end walls 95—95 have notches 100—100 for clearance of the cable 50.

A guide member 101, having an inner positioning rib 102, has peripheral flanges 103—103 forming lateral guides for the positioning ridges 96—96, these flanges being in radial alignment with the receptacle side walls 94—94, with these ridges 96—96 and the end ridges 97—97 abutting upon the periphery of the member 101.

Figure 16:
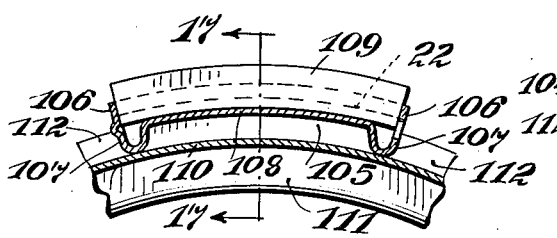
Figure 16 is a vertical section on the line 16—16 of Figure 17 and shows a further modification over what is shown in Figures 14 and 15.
Figure 17:
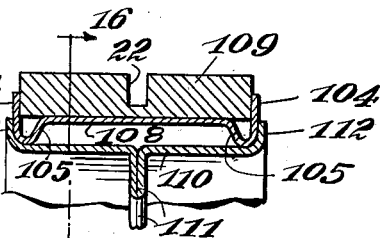
Figure 17 is a vertical section on the line 17—17 of Figure 16.

The two-part brake block of Figures 16 and 17 differs from that of Figures 14, 15, 20 and 21 chiefly as to the particular form of its carrier part. In this carrier part, receptacle side walls 104—104 merge inwardly directly into the laterally outer walls of inner positioning ridges 105—105, while receptacle end walls 106—106 similarly merge directly into the endwise outer walls of end ridges 107—107. The receptacle has a bottom 108.

A braking part 109 is similar to that 92 of Figures 14 and 15.

A guide member 110, having a positioning rib 111, has peripheral flanges 112—112 forming lateral guides for the positioning ridges 105—105, these flanges being thus laterally outward beyond the receptacle side walls 104—104.

Figure 18:
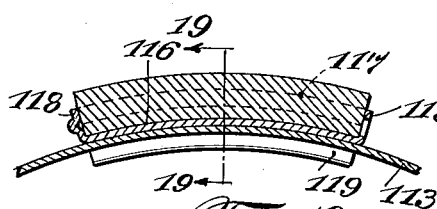
Figure 18 is a vertical section on the line 18—18 of Figure 19 and shows another modified form of the carrier part of a two-part brake block.
Figure 19:
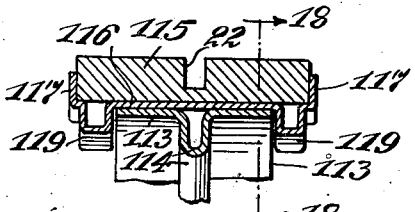
Figure 19 is a vertical section on the line 19—19 of Figure 18.

The particular construction of a two-part brake block and its guide member shown in Figures 18 and 19 partakes of features of each the four constructions shown in Figures 10 to 17 inclusive, 20 and 21, but could be different.

A guide member 113, having a hollow internal positioning rib 114 is similar to that 85—86 of Figures 10 and 11 and substantially similar to that 90—91 of Figures 12 and 13. The braking part 115 of the block is similar to that 92 of Figures 14 and 15, and to that 109 of Figures 16 and 17.

The carrier part is in some respects similar to that of Figures 14, 15, 20 and 21, as well to that of Figures 16 and 17. This carrier part has a bottom 116, side walls 117—117 and end walls 118—118, forming a receptacle. It has positioning ridges 119—119, forming inner flanges, by which it is laterally positioned upon the guide member 113, with its bottom 116 abutting upon the periphery of this guide member.

All of the five modified brake block constructions of Figures 10 to 21 inclusive can be readily embodied in the brake construction described with reference to Figures 1 to 9 inclusive, and the manner of operation in general will be substantially as already described.

In the modification shown in Figures 22—24 inclusive, there is shown an expansion device 125 which takes the place of the eccentric cams 37—37 of Figure 1 and is located preferably opposite the hydraulic cylinder 58. A pair of angular thrust transmitting members 126 and 127 bear against intermediate blocks 19—19 at their outer ends 128—129 and are guided within the flanges 24—24 of guide member 23. The inner sides of members 126 and 127 are cut angular at 130 and 131, having grooves 132 and 133 cut therein. The top surface has grooves 134, 135 to guide the flexible tension member 50.

Wedge blocks 136 and 137 have corresponding angular faces 139—140 and guide ribs 141—142 to engage the angular faces 130—131 and grooves 132—133 of members 126—127 respectively.

A threaded bolt 143, having a squared portion 144 with countersink head on one side and a split nut 145 on the other side thereof, connects in corresponding holes the wedge blocks 136—137.

An opening 146 is provided in mounting plate 5 to get access for adjusting nut 145. Thus it can readily be seen that by pressing wedges 136, 137 together by turning nut 145 home, the brake lining blocks 19—19 will be expanded peripherally.

It is obvious that various modifications may be made in the constructions shown in the drawings and above particularly described, within the principle and scope of our invention as defined in the appended claims.

We do not limit ourselves specifically as to materials, size, shape, proportions, relationship or specific features, as illustrated in the accompanying drawings and above particularly described, these being given simply as a means for clearly describing the device of our invention.

What we claim is:

1. In a brake, in combination, an arcuate series of unconnected endwise abutting brake blocks having peripherally outer braking faces, an arcuate guide against which the centrally inner faces of said blocks abut in the released condition of the brake, and means whereby said guide can be adjusted radially so as to compensate for braking wear upon said blocks together with brake-applying means for said blocks and operative independently of said guide.

2. In a brake, in combination, an arcuate series of unconnected endwise abutting brake blocks having peripherally outer braking faces, an arcuate guide against which the centrally inner faces of said blocks abut in the released condition of the brake, and an arcuate series of rotatively adjustable cams arranged to act radially upon said guide so as to compensate for braking wear upon said blocks together with brake-applying means for said blocks and operative independently of said guide.

3. In a brake, in combination, an arcuate series of unconnected endwise abutting brake blocks having peripherally outer braking faces, a resilient arcuate guide member having limited circumferential movement against which guide the centrally inner faces of said blocks abut in the released condition of the brake, and means whereby said member can be adjustably sprung radially so as to compensate for braking wear upon said blocks together with brake-applying means for said blocks and operative independently of said guide.

4. In a brake, in combination, an arcuate series of unconnected endwise abutting brake blocks having peripherally outer braking faces, a resilient arcuate guide member having limited circumferential movement against which guide the centrally inner faces of said blocks abut in the released condition of the brake, and an arcuate series of rotatively adjustable cams arranged to expand said member so as to compensate for braking wear upon said blocks together with brake-applying means for said blocks and operative independently of said guide.

5. In a brake, in combination, an arcuate series of unconnected endwise abutting brake blocks having peripherally outer braking faces and having terminal blocks spaced apart, and an adjustable abutment stop for each of said terminal blocks, and a pair of intermediate, arcuately adjustable, thrust-transmitting members engaged by the respective stops to vary the spacing between the terminal blocks in the released condition of the brake.

6. In a brake, in combination, an arcuate series of unconnected endwise abutting brake blocks having peripherally outer braking faces and having terminal blocks spaced apart, and a pair of rotatively adjustable cams forming adjustable abutment stops respectively for said terminal blocks and, a pair of intermediate, arcuately adjustable, thrust-transmitting members engaged by the respective cams to vary the spacing between the terminal blocks in the released condition of the brake.

7. In a brake, in combination, an arcuate series of unconnected endwise abutting brake blocks having peripherally outer braking faces and having terminal blocks spaced apart, an arcuate guide against which the centrally inner faces of said blocks abut in the released condition of the brake, means whereby said guide can be adjusted radially so as to compensate for braking wear upon said brake blocks, and an adjustable abutment stop for each of said terminal blocks arranged to vary the spacing between the latter in the released condition of the brake and in conformity with the adjustment of said brake block guide.

8. In a brake, in combination, an arcuate series of unconnected endwise abutting brake blocks having peripherally outer braking faces and having terminal blocks spaced apart, an arcuate guide against which the centrally inner faces of said blocks abut in the released condition of the brake, an arcuate series of rotatively adjustable cams arranged to act radially upon said guide so as to compensate for braking wear upon said blocks, and a pair of rotatively adjustable cams forming adjustable abutment stops respectively for said terminal blocks and arranged to vary the spacing between the latter in the released condition of the brake in conformity with the adjustment of said series of cams.

9. In a brake, in combination, an arcuate series of unconnected endwise abutting brake blocks, having peripherally outer braking faces, and having terminal blocks spaced apart, an arcuate guide against which the centrally inner faces of said blocks abut in the released condition of the brake, means whereby said guide can be adjusted radially so as to compensate for braking wear upon said brake blocks, an adjustable abutment stop for each of said terminal blocks arranged to vary the spacing between the latter in the released condition of the brake and in conformity with the adjustment of said brake block guide, brake-applying means arranged to apply a separating thrust to said terminal blocks, and adjustable means interposed between said brake-applying means and each of said terminal blocks and arranged to compensate for variations in spacing between the latter in conformity with the adjustment of said brake block guide and of said abutment stops.

10. In a brake, in combination, an arcuate series of unconnected endwise abutting brake blocks having peripherally outer braking faces and having terminal blocks spaced apart, an arcuate guide against which the centrally inner faces of said blocks abut in the released condition of the brake, means whereby said guide can be adjusted radially so as to compensate for braking wear upon said brake blocks, an adjustable abutment stop for each of said terminal blocks arranged to vary the spacing between the latter in the released condition of the brake and in conformity with the adjustment of said brake block guide, two independently operable brake-applying means each arranged to apply a separating thrust to said terminal blocks without obstruction of the braking operation by the other said brake-applying means.

11. In a brake, in combination, an arcuate series of unconnected endwise abutting brake blocks having peripherally outer braking faces and having terminal blocks spaced apart, a resilient arcuate guide member against which the centrally inner faces of said blocks abut in the released condition of the brake, means whereby said member can be adjustably sprung radially so as to compensate for braking wear upon said blocks, a pair of thrust-transmitting members respectively abutting against the spaced ends of said terminal blocks and slidably guided upon the end portions of said brake block guide member, without abutment therewith, and an adjustable abutment stop for each of said thrust-transmitting members arranged to vary the spacing between the latter in conformity with the adjustment of said brake block guide member.

12. In a brake, in combination, an arcuate series of unconnected endwise abutting brake blocks having peripherally outer braking faces and having terminal blocks spaced apart, a resilient arcuate guide member against which the centrally inner faces of said blocks abut in the released condition of the brake, means whereby said member can be adjustably sprung radially so as to compensate for braking wear upon said blocks, a pair of thrust-transmitting members respectively abutting against the spaced ends of said terminal blocks and slidably guided upon the end portions of said brake block guide member without abutment therewith, an adjustable abutment stop for each of said thrust-transmitting members arranged to vary the spacing between the latter in conformity with the adjustment of said brake block guide member, and a stationary mounting frame carrying said abutment stops and said adjusting means for said brake block guide member and upon which the latter is adjustably positioned.

13. In a brake, in combination, an arcuate series of unconnected endwise abutting brake blocks having peripherally outer braking faces and having terminal blocks spaced apart, a resilient arcuate guide member against which the centrally inner faces of said blocks abut in the released condition of the brake, means whereby said member can be adjustably sprung radially so as to compensate for braking wear upon said blocks, a pair of thrust-transmitting members respectively abutting against the spaced ends of said terminal blocks and slidably guided upon the end portions of said brake block guide member without abutment therewith, an adjustable abutment stop for each of said thrust-transmitting members arranged to vary the spacing between the latter in conformity with the adjustment of said brake block guide member, a hydraulic brake-applying cylinder having longitudinally adjustable piston-rod extensions arranged to apply a separating thrust to said thrust-transmitting members so as to compensate for variations in the spacing of the latter in conformity with the adjustment of said brake block guide member and of said abutment stops.

14. In a brake, in combination, an arcuate series of unconnected endwise abutting brake blocks having peripherally outer braking faces and having terminal blocks spaced apart, a resilient arcuate guide member against which the centrally inner faces of said blocks abut in the released condition of the brake, means whereby said member can be adjustably sprung radially so as to compensate for braking wear upon said blocks, a pair of thrust-transmitting members respectively abutting against the spaced ends of said terminal blocks and slidably guided upon the end portions of said brake block guide member without abutment therewith, an adjustable abutment stop for each of said thrust-transmitting members arranged to vary the spacing between the latter in conformity with the adjustment of said brake block guide member, hydraulic brake-applying means comprising a cylinder having a pair of independently movable longitudinally adjustable piston-rod extensions arranged to abut against and to apply a separating thrust to said thrust-transmitting members so as to compensate for variations in the spacing of the latter in conformity with the adjustment of said brake block guide and of said abutment stops, and other brake-applying means arranged to apply a separating thrust to said thrust-transmitting members, each of said brake-applying means being arranged to be operable independently of the other and without the braking operation being obstructed in either instance.

15. In a brake, in combination, an arcuate series of unconnected endwise abutting brake blocks having peripherally outer braking faces and having terminal blocks arcuately spaced apart, an arcuate guide against which the centrally inner faces of said blocks abut in the released condition of the brake, brake-applying means arranged to apply a separating thrust to said terminal blocks, a brake-releasing flexible tensile member encircling said series of blocks, and a spring-actuated retractile coupling detachably connecting together the ends of said tensile member without having any other connection and disposed entirely within the arcuate space between said terminal blocks.

16. In a brake, in combination, an arcuate series of unconnected endwise abutting brake blocks having peripherally outer braking faces and having terminal blocks spaced apart, an arcuate guide against which the centrally inner faces of said blocks abut in the released condition of the brake, a hydraulic brake-applying cylinder positioned in the space between said terminal blocks and arranged to apply a separating thrust to the latter, a brake-releasing flexible tensile member encircling said series of blocks and having its ends extended beyond the spaced ends of said terminal blocks, and a spring-actuated retractile coupling detachably connecting together the ends of said tensile member and disposed as a whole radially outward beyond said cylinder.

17. In a brake, in combination, an arcuate series of unconnected endwise abutting brake blocks having peripherally outer braking faces, an arcuate guide having limited circumferential movement and against which guide the centrally inner faces of said blocks abut in the released condition of the brake, said blocks being of greater width than said guide, and inner flanges upon said blocks by which they are laterally positioned upon said guide, together with brake-applying means for said blocks and operative independently of said guide.

18. In a brake, in combination, an arcuate series of unconnected endwise abutting brake blocks having peripherally outer braking faces, an arcuate guide having limited circumferential movement and against which guide the centrally inner faces of said blocks abut in the released condition of the brake, said blocks being of greater width than said guide, a said block consisting of an inner carrier part and a radially outer braking part carried by said carrier part, and inner flanges upon said carrier part by which said blocks are laterally positioned upon said guide, together with brake-applying means for said blocks and operative independently of said guide.

19. In a brake, in combination, an arcuate series of unconnected endwise abutting brake blocks having peripherally outer braking faces and an arcuate guide against which the centrally inner faces of said blocks abut in the released condition of the brake, a said block consisting of a radially outer braking part and an inner carrier part forming a receptacle within which said braking part is seated.

20. In a brake, in combination, an arcuate series of unconnected endwise abutting brake blocks having peripherally outer braking faces, an arcuate guide against which the centrally inner faces of said blocks abut in the released condition of the brake, said blocks being of greater width than said guide, a said block consisting of a radially outer braking part and an inner carrier part forming a receptacle within which said braking part is seated, and inner flanges upon said carrier part by which said blocks are laterally positioned upon said guide.

JOSEPH W. JONES.
FRANK C. REILLY.